United States Patent
Li et al.

(10) Patent No.: US 11,490,198 B1
(45) Date of Patent: Nov. 1, 2022

(54) SINGLE-MICROPHONE WIND DETECTION FOR AUDIO DEVICE

(71) Applicant: Cirrus Logic International Semiconductor Ltd., Edinburgh (GB)

(72) Inventors: Ning Li, Cedar Park, TX (US); Teja Buddha, Mesa, AZ (US); Mohamed Sabet, Mesa, AZ (US); Doug Olsen, Mesa, AZ (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 17/384,983

(22) Filed: Jul. 26, 2021

(51) Int. Cl.
*H04R 3/00* (2006.01)
*G06F 3/16* (2006.01)

(52) U.S. Cl.
CPC ............... *H04R 3/00* (2013.01); *G06F 3/165* (2013.01); *H04R 2410/07* (2013.01)

(58) Field of Classification Search
CPC ....... H04R 3/00; H04R 2410/07; G06F 3/165; G10K 11/17823; G10K 11/17835; H03G 3/32; H03G 3/005; H03G 2410/01
USPC ................... 381/57, 71.13, 71.14, 94.1–94.9
See application file for complete search history.

(56) References Cited

U.S. PATENT DOCUMENTS

| | | | |
|---|---|---|---|
| 7,340,068 B2* | 3/2008 | Petersen | H04R 3/005 381/94.1 |
| 8,019,103 B2* | 9/2011 | Kates | H04R 25/505 381/317 |
| 8,428,275 B2* | 4/2013 | Yoshida | H04R 3/04 381/94.1 |
| 8,457,320 B2* | 6/2013 | Konchitsky | H04R 3/007 704/226 |
| 8,781,137 B1* | 7/2014 | Goodwin | G10L 21/0208 381/94.1 |
| 8,914,282 B2* | 12/2014 | Konchitsky | G10L 21/0208 704/226 |
| 8,983,833 B2* | 3/2015 | Joshi | H04R 3/00 704/226 |
| 9,253,568 B2* | 2/2016 | Nemer | H04R 3/007 |
| 9,761,214 B2* | 9/2017 | Dickins | H04R 29/004 |
| 10,504,537 B2* | 12/2019 | Sapozhnykov | G10L 21/0216 |

FOREIGN PATENT DOCUMENTS

WO      2013091021 A1      6/2013

* cited by examiner

*Primary Examiner* — Xu Mei
(74) *Attorney, Agent, or Firm* — Jackson Walker L.L.P.

(57) ABSTRACT

A method for detecting wind noise incident on a single microphone may include receiving an audio signal indicative of sound incident on the single microphone, dividing the audio signal into a plurality of audio frames, and determining whether wind noise is incident on the single microphone based on a combination of a correlation metric between successive audio frames of the plurality of audio frames and a power ratio difference between a first power ratio and a second power ratio. The first power ratio may equal an amount of power present in a first frequency range of the audio signal to a total amount of power present in the audio signal across all frequencies. The second power ratio may equal an amount of power present in a second frequency range of the audio signal to the total amount of power present in the audio signal across all frequencies.

18 Claims, 1 Drawing Sheet

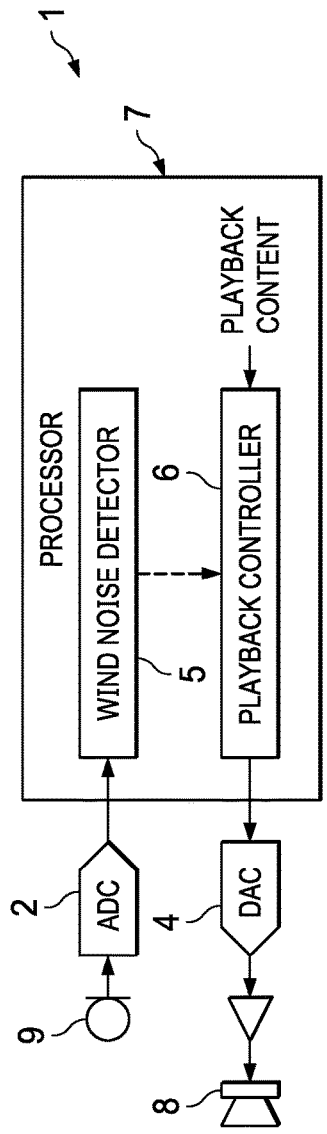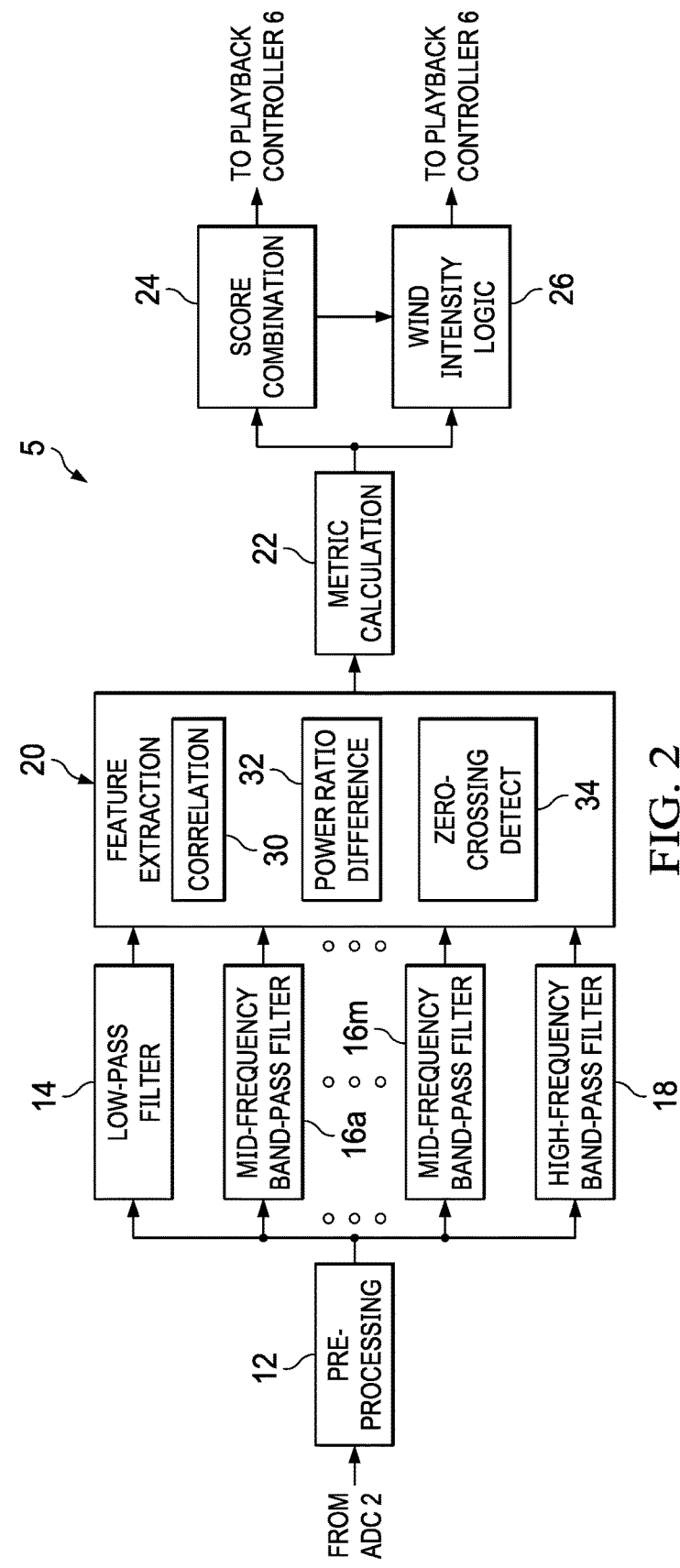

SINGLE-MICROPHONE WIND DETECTION FOR AUDIO DEVICE

TECHNICAL FIELD

The field of representative embodiments of this disclosure relates to methods, apparatuses, and implementations concerning or relating to voice applications in an audio device. Applications may include detection of wind noise using a single microphone of an audio device.

BACKGROUND

In audio devices, including mobile devices such as hearing aids, cochlear implants, mobile telephones, headphones, and earbuds, it may be desirable to detect the presence or intensity of wind in real time. However, current wind detection techniques have many disadvantages.

For example, some existing wind detection techniques require the use of multiple microphones and rely on a correlation or other similarity technique among microphone signals generated from the multiple microphones. Existing single-microphone wind detection techniques typically employ neural networks or other machine learning techniques which require a large amount of processing resources.

A technique for wind detection using a single microphone without the need for a large amount of processing resources may be desired.

SUMMARY

In accordance with the teachings of the present disclosure, one or more disadvantages and problems associated with existing approaches to wind detection in audio devices may be reduced or eliminated.

In accordance with embodiments of the present disclosure, a method for detecting wind noise incident on a single microphone may include receiving an audio signal indicative of sound incident on the single microphone, dividing the audio signal into a plurality of audio frames, and determining whether wind noise is incident on the single microphone based on a combination of a correlation metric between successive audio frames of the plurality of audio frames and a power ratio difference between a first power ratio and a second power ratio. The first power ratio may equal an amount of power present in a first frequency range of the audio signal to a total amount of power present in the audio signal across all frequencies. The second power ratio may equal an amount of power present in a second frequency range of the audio signal to the total amount of power present in the audio signal across all frequencies.

In accordance with these and other embodiments of the present disclosure, a system for detecting wind noise incident on a single microphone may include an input configured to receive an audio signal indicative of sound incident on the single microphone and a processor communicatively coupled to the input and configured to divide the audio signal into a plurality of audio frames and determine whether wind noise is incident on the single microphone based on a combination of a correlation metric between successive audio frames of the plurality of audio frames and a power ratio difference between a first power ratio and a second power ratio. The first power ratio may equal an amount of power present in a first frequency range of the audio signal to a total amount of power present in the audio signal across all frequencies. The second power ratio may equal an amount of power present in a second frequency range of the audio signal to the total amount of power present in the audio signal across all frequencies.

In accordance with these and other embodiments of the present disclosure, an audio device may include a microphone configured to obtain an audio signal indicative of sound incident on the microphone and a processor communicatively coupled to the processor and configured to, based solely on the audio signal derived from the microphone and no other signals from any other microphones, divide the audio signal into a plurality of audio frames and determine whether wind noise is incident on the microphone based on a combination of a correlation metric between successive audio frames of the plurality of audio frames and a power ratio difference between a first power ratio and a second power ratio. The first power ratio may equal an amount of power present in a first frequency range of the audio signal to a total amount of power present in the audio signal across all frequencies. The second power ratio may equal an amount of power present in a second frequency range of the audio signal to the total amount of power present in the audio signal across all frequencies.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein:

FIG. 1 illustrates an example audio device, in accordance with embodiments of the present disclosure; and FIG. 2 illustrates an example functional block diagram of a wind noise detector, in accordance with embodiments of the present disclosure.

DETAILED DESCRIPTION

FIG. 1 illustrates an example audio device 1, in accordance with embodiments of the present disclosure. Audio device 1 may comprise any suitable system, device, or apparatus for receiving audio signals (e.g., via a microphone), playing back audio signals (e.g., via a loudspeaker), and/or processing audio signals. For example, audio device 1 may comprise a hearing aid, a cochlear implant, a mobile telephone, a headphone, an earbud, and/or a combination thereof. As shown in FIG. 1, audio device 1 may include a microphone 9, an analog-to-digital converter (ADC) 2, a processor 7, a digital-to-analog converter (DAC) 4, and an output audio transducer 8 (e.g., a loudspeaker).

Microphone 9 may include any suitable input audio transducer, including without limitation, an electret microphone, condenser microphone, capacitive microphone, microelectromechanical systems (MEMS) microphone, or any other suitable microphone. In operation, microphone 9 may sense sound and generate an analog electronic signal representative of such sound.

ADC 2 may comprise any suitable system, device, or apparatus configured to convert the analog signal generated by microphone 9 into an equivalent digital input audio signal.

Processor 7 may include a microprocessor, digital signal processor, application-specific integrated circuit, field-programmable gate array, complex logic device, electrically-erasable programmable read-only memory, or other suitable processing device. Signal processing functionality of processor 7 may include a wind noise detector 5 and playback controller 6.

Wind noise detector 5 may receive the digital input audio signal generated by ADC 2 and may analyze the digital input audio signal, as described in greater detail below, to determine a presence and intensity of wind in the digital input audio signal. In addition, wind noise detector 5 may generate one or more digital signals indicative of the presence and intensity of wind in the digital input audio signal, which one or more digital signals may be communicated to playback controller 6.

If wind noise is detected by wind noise detector 5, playback controller 6 may modify a characteristic of audio information (shown as "playback content" in FIG. 1) reproduced to output audio transducer 8.

DAC 4 may comprise any suitable system, device, or apparatus configured to convert the modified audio signal generated by playback controller 6 to an equivalent analog output audio signal. Such analog output audio signal may be amplified and communicated to output audio transducer 8 for playback of modified audio information.

FIG. 2 illustrates an example functional block diagram of wind noise detector 5, in accordance with embodiments of the present disclosure. As shown in FIG. 2, wind noise detector 5 may include a pre-processing block 12, a low-pass filter 14, one or more mid-frequency band-pass filters 16 (e.g., mid-frequency band-pass filters 16a, . . . , 16m), a high-frequency band-pass filter 18, a feature extraction block 20, a metric calculation block 22, a score combination block 24, and a wind intensity logic block 26.

Pre-processing block 12 may be configured to perform any suitable pre-processing of the digital input audio signal in order to condition the digital input audio signal for processing by other functional components of wind noise detector 5. Pre-processing tasks may vary based on wind noise detection requirements of a particular system. In some embodiments, pre-processing block 12 may remove direct-current (DC) components of the digital input audio signal and/or down sample the digital input audio signal. In these and other embodiments, pre-processing block 12 may divide the digital input audio signal into suitably-sized frames (or windows) for further processing by other components of wind noise detector 5.

Low-pass filter 14 may low-pass filter the digital input audio signal, as conditioned by pre-processing block 12, at a predetermined corner frequency (e.g., 200 Hz) to filter out high-frequency components of the digital input audio signal above the corner frequency.

Each mid-frequency band-pass filter 16 may band-pass filter the digital input audio signal, as conditioned by pre-processing block 12, at predetermined pass bands in order to pass components of the digital input audio signal within the respective pass bands of mid-frequency band-pass filters 16. For example, in particular embodiments of the present disclosure, wind noise detector 5 may include two frequency band-pass filters 16 having pass bands of 200 Hz to 400 Hz and of 400 Hz to 1000 Hz, respectively.

High-frequency band-pass filter 18 may band-pass filter the digital input audio signal, as conditioned by pre-processing block 12, at a predetermined pass band (e.g., 1500 Hz to 3000 Hz) in order to pass components of the digital input audio signal within the pass band of high-frequency band-pass filter 18.

Feature extraction block 20 may process the filtered signals generated by low-pass filter 14, mid-frequency band-pass filters 16, and high-frequency band-pass filter 18, and based thereon, extract one or more features that may be indicative of the presence and/or intensity of wind noise present at microphone 9. For example, as described in greater detail below, such features may include correlation between successive frames of the digital input audio signal, power ratio of signal content in particular bands of the digital input audio signal to overall signal content, and a number of signal zero crossings occurring in the digital input audio signal over a predetermined period of time.

Correlation block 30 of feature extraction block 20 may evaluate a correlation of successive frames (e.g., "current" frame and "previous" frame) of the digital input audio signal, as filtered by low-pass filter 14. In laboratory simulations, wind was seen to be turbulent at low frequencies while diffuse noise (e.g., vehicle noise, babble) tended to remain more constant at lower frequencies. Thus, a lower correlation at low frequencies between successive frames may indicate the presence of wind noise and such signal correlation of successive frames may be used to differentiate wind noise from diffuse noise.

Power ratio difference block 32 of feature extraction block 20 may evaluate, for each particular frame of the digital input audio signal (as filtered by low-pass filter 14, mid-frequency band-pass filters 16, and high-frequency band-pass filter 18), a ratio of power present in each of the respective pass bands of low-pass filter 14, mid-frequency band-pass filters 16, and high-frequency band-pass filter 18 to an overall power of the digital input audio signal across all frequencies. The power ratio differences may further be calculated based on the band power ratio. In laboratory simulations, vehicle noise was seen to be dominant over wind noise at lower frequencies, while speech, babble, and music noise was seen to be dominant over wind noise at higher frequencies. Further, the spectrum of wind at pass bands of mid-frequency band-pass filters 16 may be different from that of other noise sources. Thus, these power ratios may be used to differentiate between wind noise and other noise sources.

Zero-crossing detect block 34 of feature extraction block 20 may evaluate, for a particular period of time of the digital input audio signal, a number of zero crossings of the digital input audio signal. Such evaluation may be made for the entire digital input audio signal across all frequencies, as well as at intermediate frequencies (e.g., at the pass bands of mid-frequency band-pass filters 16). Evaluations of zero crossings may be performed for each of a plurality of windows, each window having the particular period of time. Each of such windows may comprise a plurality (e.g., 2 to 4) of frames of the digital input audio signal used by correlation block 30 and power ratio difference block 32. In laboratory simulations, speech was seen to have a greater frequency of zero crossings, as compared to wind noise, across the entire frequency spectrum of the digital input audio signal as well as at the pass bands of mid-frequency band-pass filters 16. Thus, counting zero crossings within a window of time of the digital input audio signal may be used to differentiate wind noise from speech or other sources of noise.

Metric calculation block 22 may, for each feature extracted by feature extraction block 20 (e.g., correlation, power ratio difference, zero crossings, etc.), calculate a score for such feature, the score for each feature representing a probability that such feature indicates a presence of wind noise. For example, metric calculation block 22 may compute a score for correlation based on a determination of correlation between successive frames. As another example, metric calculation block 22 may compute a score for power ratio based on the determined power ratios described above. As a further example, metric calculation block 22 may compute a score for zero crossings based on a number of zero crossings occurring during a window. In some embodiments, scores for the individual features may each be normalized (e.g., have a value between 0 and 1).

Score combination block 24 may combine the scores for the individual features to determine a combined score of the features. In some embodiments, the combined score may be a weighted sum of the scores of the individual features wherein one or more individual features may be weighted more heavily than the others. Score combination block 24 may also compare the combined score for a particular frame of the digital input audio signal against a first predetermined threshold to determine whether such combined score is indicative of the presence of wind within such frame. Further, score combination block 24 may count, for a particular window of successive frames (e.g., 20 frames, 100 frames) the number of frames for which the combined score is indicative of the presence of wind within such frame. If such number of frames exceeds a second predetermined threshold, score combination block 24 may determine such window as indicating the presence of wind noise, and may communicate an appropriate signal to playback controller 6 indicating the presence of wind noise in such window of the digital input audio signal.

Wind intensity logic 26 may analyze the metrics generated by metric calculation block 22 to determine an intensity of wind noise. In some embodiments, wind intensity logic 26 may determine a wind intensity for a window of frames if and only if score combination block 24 determines the presence of wind noise within such window. For example, in some embodiments, wind intensity logic 26 may determine that if an overall power level of the digital input audio signal across its entire frequency spectrum (as indicated by metrics extracted by power ratio difference block 32) is below a predetermined mild wind threshold, then the wind detected is of a mild or low intensity. As another example, in these or other embodiments, wind intensity logic 26 may determine that if power ratio differences extracted by power ratio difference block 32 between pass band frequencies of two or more of low-pass filter 14, mid-frequency band-pass filters 16, and high-frequency band-pass filter 18 are within a first predefined range and the power level of the digital input audio signal within the pass band of high-frequency band-pass filter 18 is below a predetermined high wind threshold, then the wind detected is of the mild or low intensity. As a further example, in these or other embodiments, wind intensity logic 26 may determine that if power ratio differences extracted by power ratio difference block 32 between pass band frequencies of two or more of low-pass filter 14, mid-frequency band-pass filters 16, and high-frequency band-pass filter 18 are within a second predefined range, the power level of the digital input audio signal within the pass band of high-frequency band-pass filter 18 is above a predetermined high wind threshold, and overall power level of the digital input audio signal across its entire frequency spectrum is above a predetermined load threshold, then the wind detected is of a high intensity. As an additional example, in these or other embodiments, if none of the foregoing conditions are met, wind intensity logic 26 may determine that the wind is of a medium intensity.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A method for detecting wind noise incident on a single microphone, comprising:
   receiving an audio signal indicative of sound incident on the single microphone;
   dividing the audio signal into a plurality of audio frames; and
   determining whether wind noise is incident on the single microphone based on a combination of:
      a correlation metric between successive audio frames of the plurality of audio frames; and
      a power ratio difference between a first power ratio and a second power ratio, wherein:
         the first power ratio equals an amount of power present in a first frequency range of the audio signal to a total amount of power present in the audio signal across all frequencies; and
         the second power ratio equals an amount of power present in a second frequency range of the audio signal to the total amount of power present in the audio signal across all frequencies.

2. The method of claim 1, further comprising determining whether wind noise is incident on the single microphone further based on a zero crossing metric indicative of a number of zero crossings of the audio signal within a predetermined time period.

3. The method of claim 2, wherein the zero crossing metric is indicative of a number of zero crossings of a full frequency spectrum of the audio signal within the predetermined time period.

4. The method of claim 2, wherein the zero crossing metric is indicative of a number of zero crossings of a portion of a full frequency spectrum of the audio signal within the predetermined time period.

5. The method of claim 1, further comprising determining an intensity of the wind noise based on the total amount of power present in the audio signal across all frequencies, a difference between the first power ratio and the second power ratio, and an amount of power present in a particular frequency range of the audio signal.

6. The method of claim 1, further comprising modifying audio information in response to determination that wind noise is incident on the single microphone.

7. A system for detecting wind noise incident on a single microphone, comprising:
   an input configured to receive an audio signal indicative of sound incident on the single microphone; and
   a processor communicatively coupled to the input and configured to:
      divide the audio signal into a plurality of audio frames; and
      determine whether wind noise is incident on the single microphone based on a combination of:
         a correlation metric between successive audio frames of the plurality of audio frames; and
         a power ratio difference between a first power ratio and a second power ratio, wherein:
            the first power ratio equals an amount of power present in a first frequency range of the audio signal to a total amount of power present in the audio signal across all frequencies; and
            the second power ratio equals an amount of power present in a second frequency range of the audio signal to the total amount of power present in the audio signal across all frequencies.

8. The system of claim 7, the processor further configured to determine whether wind noise is incident on the single microphone further based on a zero crossing metric indicative of a number of zero crossings of the audio signal within a predetermined time period.

9. The system of claim 8, wherein the zero crossing metric is indicative of a number of zero crossings of a full frequency spectrum of the audio signal within the predetermined time period.

10. The system of claim 8, wherein the zero crossing metric is indicative of a number of zero crossings of a portion of a full frequency spectrum of the audio signal within the predetermined time period.

11. The system of claim 7, the processor further configured to determine an intensity of the wind noise based on the total amount of power present in the audio signal across all frequencies, a difference between the first power ratio and the second power ratio, and an amount of power present in a particular frequency range of the audio signal.

12. The system of claim 7, the processor further configured to modify audio information in response to determination that wind noise is incident on the single microphone.

13. An audio device, comprising:
   a microphone configured to obtain an audio signal indicative of sound incident on the microphone; and
   a processor communicatively coupled to the processor and configured to, based solely on the audio signal derived from the microphone and no other signals from any other microphones:
      divide the audio signal into a plurality of audio frames; and
      determine whether wind noise is incident on the microphone based on a combination of:
         a correlation metric between successive audio frames of the plurality of audio frames; and
         a power ratio difference between a first power ratio and a second power ratio, wherein:
            the first power ratio equals an amount of power present in a first frequency range of the audio signal to a total amount of power present in the audio signal across all frequencies; and
            the second power ratio equals an amount of power present in a second frequency range of the audio signal to the total amount of power present in the audio signal across all frequencies.

14. The audio device of claim 13, the processor further configured to determine whether wind noise is incident on the single microphone further based on a zero crossing metric indicative of a number of zero crossings of the audio signal within a predetermined time period.

15. The audio device of claim 14, wherein the zero crossing metric is indicative of a number of zero crossings of a full frequency spectrum of the audio signal within the predetermined time period.

16. The audio device of claim 14, wherein the zero crossing metric is indicative of a number of zero crossings of a portion of a full frequency spectrum of the audio signal within the predetermined time period.

17. The audio device of claim 13, the processor further configured to determine an intensity of the wind noise based on the total amount of power present in the audio signal across all frequencies, a difference between the first power ratio and the second power ratio, and an amount of power present in a particular frequency range of the audio signal.

18. The audio device of claim 13, the processor further configured to modify audio information in response to determination that wind noise is incident on the single microphone.

\* \* \* \* \*